United States Patent Office 3,813,355
Patented May 28, 1974

3,813,355
ANTIMONY TALLATE CATALYSIS OF FOAMS PREPARED FROM CARBOXY-CONTAINING ADDUCT POLYOLS
John K. Allen, Batavia, Ill., assignor to Standard Oil Company, Chicago, Ill.
No Drawing. Filed Aug. 21, 1972, Ser. No. 282,465
Int. Cl. C08g 22/40, 22/44
U.S. Cl. 260—2.5 AB                    2 Claims

ABSTRACT OF THE DISCLOSURE

The catalysis of rigid urethane-type foams prepared from polyarylpolyisocyanates and free carboxy-containing adduct polyols is improved by the use of antimony tallate as the catalyst. Antimony tallate is also extremely effective in foams containing aromatic carboxylic acid derivatives as a third principal component. These foams are useful for applications requiring good fire resistant properties.

BACKGROUND OF THE INVENTION

This invention relates to an improvement in the catalysis of certain rigid urethane foams which are prepared by the reaction of polyarylpolyisocyanates with carboxy-containing adduct polyols.

The production of rigid urethane-type foams is a well known art with these foams having a wide variety of industrial and commercial applications. A primary use of urethane-type rigid foams is as an insulating material. As an insulator, rigid foams may be shaped into slabs or sheets of varying thicknesses and placed between walls, in roofs, in floors, and the like. The foams may also be used to make metal-foam composites which are prepared by foaming the urethane-type material so that it is brought in contact with or is confined by metal sheet or metal foil. This type of prefabricated composite may then be used as a structural member for walls, floors, and roofs. These rigid foams may also be formed into annular or contour shapes which are useful in insulating pipes and ducts. The rigid foams can also be directly applied to numerous substrates by spray foaming techniques. These spray foam applications are particularly important in such areas as schools and warehouses to provide the necessary insulation requirements proper for heating and cooling.

Most conventional urethane foams are 2-component foams. They are produced by reacting a polyarylpolyisocyanate with a polyfunctional alcohol or polyol such as the polyether or polyester polyols. These conventional urethane foams do not provide the necessary flame resistance, self-extinguishing characteristics and low smoke production desirable in many insulating material applications.

Certain modified urethane foam compositions have been developed which tend to overcome a number of the shortcomings of the conventional urethane foams. These modified polyurethane foams, which are disclosed in U.S. Pat. 3,637,543 contain a third principal component, an aromatic carboxylic acid derivative, such as trimellitic anhydride or the acid chloride of trimellitic anhydride.

Both the conventional 2-component urethane foams and the above-mentioned 3-component modified urethane foams have more recently been improved by the replacement of the normal polyfunctional alcohol or polyol component by adduct polyols containing free carboxyl groups. These carboxy-containing polyols are the half-ester reaction products of (a) polyether polyols and mixtures thereof with (b) anhydrides of polyfunctional carboxylic acids such as tetrabromophthalic anhydride and trimellitic anhydride. These carboxy-containing polyols contain both unreacted hydroxyl groups and carboxyl groups. Polyols of this type are described in U.S. Pat. 3,642,646. Certain 3-component modified urethane foams containing these polyols are described in British Pat. 1,246,732. Rigid urethane-type foams incorporating these free carboxy-containing adduct polyols possess very good flame resistance, good self-extinguishing characteristics, and produce little smoke when exposed to flame.

However, foams prepared from these carboxy-containing adduct polyols are not catalyzed by known urethane foam catalysts as rapidly as foams containing conventional polyols. When the rate of catalysis is measured by the time it takes the foam to rise (rise time) and the time required for the foam to become non-sticky or tack free (tack free time), conventional urethane catalysts do not provide a fast enough reaction to permit the carboxy-containing polyol foams to be used in many of the most desired applications.

In the production of slab or sheet stock, fast catalysis of the foaming reaction is not always required as equipment arrangement and such may permit foam rise and tack free times up to a few hundred seconds. Many conventional urethane catalysts, such as tertiary amines and organotin compounds, are adequate for the production of the slab or sheet stock foam. Among the tertiary amine catalysts suitable for catalyzing these foams are triethylamine, triethylenediamine, tetramethylethanediamine, tetramethylbutanediamine, diethylcyclohexylamine and pyridine. Among the suitable organo-tin compounds are stannous octoate, dibutyltin dilaurate, and particularly dibutyltin diacetate. But, the compounds from these known classes of foam catalysts do not provide sufficiently fast reaction rates for the production of metal foam composite panels, pipe insulation, and sprayed foams from either 2-component or 3-component foams prepared with carboxy-containing adduct polyols.

Another class of catalysts are the antimony carboxylates which can be represented by the general formula $Sb(OOCR)_3$ wherein R represents an alkyl group. Illustrative of antimony carboxylates include antimony triacetate, antimony tributyrate, and antimony tricaprate. U.S. Pat. 3,245,958 broadly teaches the effectiveness of antimony carboxylates as catalysts in the reaction between isocyanate-containing compounds and active hydrogen-containing compounds. The patent also teaches the greater catalytic activity of these compounds over the prior art catalysts in conventional polyurethane foams.

What I have discovered is the outstanding catalytic effectiveness of antimony tallate in foams prepared with carboxy-containing adduct polyols. While antimony tallate is an antimony carboxylate, it was not taught in U.S. Pat. 3,245,958. In addition, experiments indicate that antimony tallate is a poor catalyst for the preparation of conventional urethane foams from polyarylpolyisocyanates and conventional polyether polyols (see Example 1). In those conventional foams it is a much less effective catalyst than known amine and tin catalysts such as triethylamine and dibutyltin diacetate.

Thus, it is quite surprising that antimony tallate is such an extremely effective catalyst in both 2- and 3-component urethane foams formulated with carboxy-containing adduct polyols. In these carboxy-containing polyol foams, antimony tallate is vastly superior in catalytic activity to the conventional catalysts. For example, in the 3-component foam described in Example 3, the rise and tack free times for foams catalyzed with 2 g. of antimony tallate are 40 sec. and 106 sec., respectively. At the same catalyst level, the values for dibutyltin diacetate are 142 sec. and 365 sec. For triethylamine the values are 148 sec. and 252 sec. The effectiveness of antimony tallate is such that it renders foams prepared from the carboxy-containing polyols more useable in applications such as metal foam composites and pipe insulation.

In addition to the above described catalytic activity, the use of antimony tallate tends to improve some of the physical properties of the foams. In particular, antimony tallate tends to improve the dimensional stability and abrasion resistance of the carboxy-containing adduct polyol foams.

SUMMARY OF THE INVENTION

This invention relates to a process for producing a flame-resistant foam composition from the reaction of (1) a polyarylpolyisocyanate and (2) a carboxy-containing half-ester adduct polyol or mixture of adduct polyols which is prepared by reacting (a) at least one polyether polyol with (b) an anhydride of a polyfunctional carboxylic acid. The improvement in this process is the catalysis of the foaming reaction with a catalytic amount of antimony tallate. This invention further relates to an improvement in the process for producing a foam composition containing (1) a polyarylpolyisocyanate, (2) a carboxy-containing adduct polyol, and (3) a polyfunctional aromatic carboxylic acid derivative.

DESCRIPTION OF THE INVENTION

Antimony tallate is useful when present in concentrations of from about 0.25 to about 2.5 weight percent of starting materials. The amount of antimony tallate is preferably kept below about 1.5 percent. Concentrations higher than these may tend to produce adverse effects on other foam properties and, of course, increases the cost of the product foam.

The polyols useful in this invention are a particular class of polyols containing both free carboxyl groups and hydroxyl groups. These carboxy-containing adduct polyols may generally be described as half-ester reaction products of (a) polyether polyols and mixtures thereof with (b) anhydrides of polyfunctional carboxylic acids. Poly(ethylene glycols) may be reacted with the above components or may be added after the carboxy-containing polyols have been prepared.

The polyether polyols used in the preparation of the carboxy-containing half-ester reaction products include polyethers such as polyoxyalkylene glycols. These polyethers are obtained by the addition of one or more alkylene oxides, such as ethylene oxide, propylene oxide, and the like, to hydroxy-containing compounds such as ethylene glycol, propylene glycol, diethylene glycol, dipropylene glycol, and the like; or aliphatic polyols such as pentaerythritol, sucrose, sorbitol, alphamethyl glucoside, trimethyl propane, and the like. Particularly suitable polyether polyols include the poly(oxypropylene) adducts of pentaerythritol, sucrose, sorbitol, alphamethyl glucoside, trimethyl propane, and the like.

These polyether polyols may conveniently be blended prior to reaction in order to maintain a workable viscosity, with poly(ethylene glycols) such as diethylene glycol, triethylene glycol, tetraethylene glycol or a poly(ethylene glycol) having an average molecular weight in the range of from about 200 to about 500. A particularly preferred glycol is a poly(ethylene glycol) having an average molecular weight of about 200. When polyol/glycol blends are employed, it is advantageous that the blend comprise from about 90 to about 10 weight percent of the glycol and from about 10 to about 90 weight percent of the polyether polyol. In general, a blend of from about 80 to about 20 weight percent of the glycol and from about 20 to about 80 weight percent of the polyether polyol is satisfactory. A particularly preferred composition of the blend is from about 60 to about 25 weight percent of the glycol and from about 40 to about 75 weight percent of the polyether polyol.

The above-mentioned poly(ethylene glycols) may also be added to the prior reacted carboxy-containing polyols.

The anhydrides of polyfunctional carboxylic acids which are suitable for use in preparing the carboxy-containing polyols may be generally described as anhydrides of carboxylic acids containing two or more carboxy functions. The carboxylic acids may be either aromatic or aliphatic and may contain substituents such as alkyl or halogen in addition to the carboxy functions. Suitable anhydrides include: phthalic anhydride, tetrachlorophthalic anhydride, tetrabromophthalic anhydride, trimellitic anhydride, maleic anhydride, malonic anhydride, succinic anhydride, chlorendic anhydride (Diels-Alder reaction product of hexachlorocyclopentadiene and maleic anhydride), bisanhydride of trimellitic anhydride, pyromelletic dianhydride, and benzophenone tetracarboxylic dianhydride. Tetrabromophthalic anhydride, chlorendic anhydride, and trimellitic anhydride are especially preferred.

To form the carboxy-containing half-ester adduct polyols useful in this invention the polyether polyol, mixture of polyether polyols, or the polyether polyol/poly(ethylene glycol) blend should be combined with from about 5 to about 50 weight percent, on a total weight basis, of the anhydride of the polyfunctional carboxylic acid. A particularly preferred ratio of components is from 25 to 40 weight percent of the anhydride and from 75 to 60 weight percent of the polyether polyol or polyether polyol/poly(ethylene glycol) mixture.

The adduction reaction is conveniently carried out by combining the anhydride and polyol constituents in a vessel equipped with a stirring means, a thermometer, temperature control means, and nitrogen blanketing means. Preferably, the half-ester reaction is carried out in the presence of a basic catalyst such as triethylamine. From about 0.05 to about 2.0 weight percent of the catalyst is a suitable amount. Neither the catalyst nor the nitrogen blanketing is necessary to the preparation of the adduct, but both are included in the preferred method of preparation.

The carboxy-containing half-ester adduct, is prepared by heating the mixture of polyol and anhydride at a temperature from about 150 to 350° F., preferably 180 to 220° F., for from 1 to 16 hours. The reaction mixture is heated until the acid number corresponds to that of the half-ester reaction product. Depending upon the particular constituents, this acid number may be obtained somewhere in the range of 150 to 300° F. Usually, it is observed around 180 to 220° F. Generally, the mixture is maintained at the reaction temperature for from about 1 to about 16 hours or longer. The adduct composition is allowed to cool and is suitable for immediate use in foam preparation. It is important that the temperature of the reaction remains below the temperature at which the free carboxyl group, which forms when the hydroxy-containing compounds adds across the anhydride linkage, will react with the additional hydroxy groups to form a full ester.

Another method by which the polyol adduct composition may be prepared involves combining the anhydride of the polyol or polyol blend in a vessel, together with a catalyst if desired, and heating the mixture directly to between about 200 and 350° F. This temperature is maintained for about one hour. The resulting adduct is allowed to cool and is then ready for use.

The polyarylpolyisocyanates useful in this invention are liquids containing at least two aromatic rings, each ring being substituted by at least one isocyanato group. The aromatic rings may be suitably interconnected by one or more methylene, propylene, carbonyl, sulfoxide, sulfone or ether linkages. Isocyanate-substituted biphenyls are also suitable. The aromatic rings of any of the above compounds may be additionally substituted by ethyl, methyl, or propyl groups. Specific examples of suitable liquid polyarylpolyisocyanates for use with the invention include: polymethylene polyphenylisocyanates having from 2 to 10 benzene rings and liquid mixtures at room temperature of polymethylene polyphenylisocyanate with one or more of the following polyarylpolyisocyanates:

4,4' - diphenylmethylene diisocyanate; diphenylmethylene 3,3'-diisocynate; diphenyl diisocyanate; diphenylsulfone diisocyanate; diphenylsulfide diisocyanate; diphenyl sulfoxide diisocyanate; and diphenylpropane diisocyanate. Polymethylene polyphenylisocyanates having an average functionality of about 2.1 to 3.5 are particularly suitable isocyanates.

As indicated previously, the foams containing the carboxy-containing adduct polyols may include an aromatic carboxylic acid derivatives as a third principal component. The preesnce of this third component tends to reduce the smoke produced on exposure to flame and helps to improve the flame resistance of the foam. The aromatic carboxylic acid derivatives contemplated for use here are polyfunctional derivatives, having the aromatic nucleus substituted by members selected from the group consisting of carboxyl, anhydride or acyl halide. More than one member of this group may be present on the aromatic nucleus. Other substituents may also be present on the aromatic nucleus; for example, alkyl groups containing one to four carbon atoms, nitro groups and halide groups. Illustrative aromatic carboxylic acid derivatives are trimellitic acid anhydride, trimellitic acid, double anhydride of trimellitic anhydride, trimellitic acid halide, pyromellitic dianhydride, pyromellitic acid, terephthalic acid, phthalic acid, phthalic anhydride, isophthalic acid, trimesic acid, and benzophenone tetracarboxylic acid or the dianhydride or acyl halide derivatives thereof.

In addition to the above-described principal or major components, the foams intended to be used with the catalyst of this invention can contain other ingredients. Among the ingredients usually added is a blowing agent. The amount of blowing agent combined with the reactant mixture can vary from about 1 to about 25 weight percent. An advantageous amount of blowing agent is about 10 to 20 weight percent of the foam component mixture.

It is often advantageous to employ additive materials which produce certain effects in the foam composition. One such additive is a silicone surfacant. Silicones of the type useful in rigid foam preparation are surface tension depressants. As such, they reduce the energy required to form new surfaces and thus promote bubble formation. Highly effective agents will also favor the production of finer, more uniform bubbles and resulting cell structure. The silicones also equalize tensions on the surface of the bubble, resulting in a foam of increased strength. Silicone surfactants useful in the foams of this invention may be generally described as siloxane glycol block copolymers with specific gravity in the range 0.5 to 1.5 and viscosity at 25° C. in the range 1 to 1000 cps. The amount of surfactants present can vary from about 0.01 to about 2.0 weight percent of the foam component mixture. An advantageous amount is from about 0.5 to about 1.0 weight percent.

Although they may have serious drawbacks in certain formulations, flame retardants are another type of additive sometimes useful in rigid foams which are used for insulation purposes. The principal types of flame retardants are non-reactive solids and liquids. Many of these compounds are known in the art. Antimony trioxide and halogenated organo-phosphorus compounds are examples of these inert flame retardants. An advantageous amount of these fire retardant additives is from about 3 to about 6 weight percent of the foam reactant mixture.

Of course, other additives known in the art can be added to the foams disclosed herein without departing from the scope of the invention.

Many known methods of foam production can be used to combine the various ingredients used in the foam. One method is to combine all the ingredients simultaneously. This is usually not practical as the number of components to be combined can be quite large. Preferably all of the minor ingredients and the catalyst and most or all of the blowing agent are premixed with one of the principal components, either the polyarylpolyisocyanate or the polyol, before the principal components are combined. Generally it is preferred to combine the catalyst and the other ingredients with the polyol component, although the catalyst and most of the other ingredients can be combined with the polyarylpolyisocyanate.

With a 2 principal component foam system the formulation usually employs from about 0.5 to about 12 equivalents of polyarylpolyisocyanate for each hydroxy equivalent of the carboxy-containing adduct polyol. Advantageously the polyarylpolyisocyanate will be employed in an amount equal to from 0.8 to about 1.5 equivalents for each hydroxy equivalent of adduct polyol.

In the 3-component foam system, the aromatic carboxylic acid derivative can be rapidly mixed with either the polyarylpolyisocyanate or polyol with the resulting mixture then being mixed with the remaining component. In another version all three principal components can be added instantaneously. A preferred method is to prepare a polyarylpolyisocyanate polyfunctional aromatic acid derivative foam precursor mix and react this with the polyol. The catalyst, blowing agent, and other ingredients are added to these components as described above.

In a suitable formulation, the ratio of equivalents of the liquid polyarylpolyisocyanate to the polyfunctional aromatic carboxylic acid derivative is from 0.6:1.0 to 4.0:1.0 and the ratio of equivalents of the adduct polyol, based on hydroxyl, to the polyarylpolyisocyanate and aromatic carboxylic acid derivative is from 0.1:1.0 to 3.0:1.0. In these calculations, the anhydride group is assigned a functionality of 1 (one). All ratios are calculated using the initial functionality of the starting materials. In a more preferred formulation, the ratio of equivalents of the polyisocyanate to the aromatic carboxylic acid derivative is from 1.1:1.0 to 2.2:1.0 and the ratio of equivalents of the polyol hydroxyl to the polyisocyanate and the aromatic carboxylic acid derivative is 0.15:1.0 to 0.9:1.0.

The effectiveness of any particular catalyst is usually determined by measuring the time required for the mixed foam components to rise (rise time) and the time required for the foam to become non-sticky (tack free time). In laboratory work, where relative rise and tack free times are important, absolute rise and tack free times are not always measured. In the experiments below, the rise time is determined by measuring the time (in seconds) required for the foam to rise to the top of a 12 inch high paper tub. This generally corresponds to about three-fourths of the total foam rise. The tack free time is taken to be the time (sec.) required for the foam to become non-sticky when contacted with a wooden tongue depressor.

The measurement of these times begins at the end of the mixing period. Typically, foam components need to be mixed for from 15 to 30 seconds in order to develop good foam properties. However, in studies of the relative effectiveness of various catalysts this mixing time was sometimes reduced to as little as 5 seconds in order to permit some meaningful time differences to be obtained.

Rise and tack free times of a few hundred seconds are generally permissible in the production of bun stock foam as fast catalysis is not usually necessary. Shorter rise and tack free times are required for the production of metal foam composite panels and pipe insulation, and even shorter times are necessary in spray foam applications.

EXAMPLE 1

In this example various catalysts were tested for their effectiveness in a conventional 2-component urethane foam. The results in Table I indicate that triethylamine and dibutyltin diacetate are far superior catalysts for 2-component urethane foam systems containing conventional polyether polyols than is antimony tallate.

The foam formulation used was:

| | Weight (g.) |
|---|---|
| Isocyanate A | 146 |
| Polyol B | 99 |
| Polyethylene glycol E-200 | 1 |

| | Weight (g.) |
|---|---|
| Silicone surfactant | 2 |
| Blowing agent R-11 (CFCl₃) | 30 |
| Catalyst | As below |

Isocyante A was a polyarylpolyisocyanate with an average equivalent weight of 133 and an average functionality of 3.1–3.2.

Polyol B was a propylene oxide adduct of pentaerythritol with an average equivalent weight of 100 and an average functionality of 4.

Polyethylene glycol E-200 was a polyethylene glycol with an average equivalent weight of 100 and a functionality of 2.

The polyol, polyethylene glycol, surfactant, blowing agent, and catalyst were blended together at room temperature. The isocyanate was added all at once with the mixture being stirred with a high speed blade blender for 30 seconds.

TABLE I

| Catalyst | Weight (g.) | Mixing time (sec.) | Rise time | Tack free time |
|---|---|---|---|---|
| Triethylamine | 1 | 30 | 106 | 207 |
| Do | 2 | 30 | 72 | 129 |
| Dibutyltin diacetate | 1 | 30 | 124 | 145 |
| Antimony tallate | 1 | 30 | >600 | >600 |
| Do | 2 | 30 | 117 | 165 |

EXAMPLE 2

In this example the same catalysts were tested for their effectiveness in a 2-component urethane foam prepared with a carboxy-containing half-ester adduct polyol. The data indicates that antimony tallate is an exceptionally fast catalyst for this reaction and that it is vastly superior to the conventional amine and tin catalysts in regard to both foam rise and foam tack free times.

The foam formulation used in this example was:

| | Weight (g.) |
|---|---|
| Isocyanate A | 147 |
| Polyol C | 167 |
| E-200 | 1 |
| Silicone surfactant | 2 |
| R-11 | 30 |
| Catalyst | Varied |

Isocyanate A was defined in Example 1.

Polyol C is a carboxy-containing adduct polyol prepared by reacting tetrabromophthalic anhydride, a polyethylene glycol, and a propylene oxide adduct of pentaerythritol with an average equivalent weight of 100 and an average functionality of 4. The weight ratio of these reactants was 2:1:2.

The components were mixed in the manner described in Example 1 for the times indicated below.

TABLE II

| Catalyst | Weight (g.) | Mixing time | Rise time | Tack free time |
|---|---|---|---|---|
| None | 0 | 30 | 356 | 603 |
| Triethylamine | 1 | 30 | 313 | 523 |
| Do | 2 | 10 | 309 | 498 |
| Dibutyltin diacetate | 1 | 30 | 193 | 327 |
| Antimony tallate | 1 | 30 | 53 | 105 |
| Do | 2 | 10 | 42 | 84 |

EXAMPLE 3

In this example the catalysts were tested for their effectiveness in a 3-component modified urethane foam prepared with a carboxy-containing adduct polyol. The data in Table III again indicates that the use of antimony tallate in half-ester adduct polyols results in faster rise and tack free times than could be obtained via the use of conventional urethane catalysts.

The foam formulation used in the experiments of this example was:

| | Weight (g.) |
|---|---|
| Isocyanate A | 100 |
| Trimellitic anhydride | 55 |
| Polyol C | 68 |
| E-200 | 13 |
| Polyol D | 20 |
| Silicone surfactant | 2 |
| Liquid halogenated organo-phosphorus flame retardant | 15 |
| R-11 | 40 |
| Catalyst | As below |

Polyol D is a propylene oxide adduct of sucrose with an average equivalent weight of 106 and an average functionality of 8.

Components A and C were described above.

A mixture of the isocyanate, trimellitic anhydride, and a portion of the blowing agent was added to a mixture of the other ingredients and stirred for the time indicated below.

TABLE III

| Catalyst | Weight (g.) | Mixing time | Rise time | Tack free time |
|---|---|---|---|---|
| None | 0 | 5 | 280 | 564 |
| Triethylamine | 1 | 30 | 134 | 219 |
| Do | 2 | 10 | 148 | 252 |
| Dibutyltin diacetate | 1 | 5 | 210 | 487 |
| Do | 2 | 5 | 142 | 365 |
| Antimony tallate | 1 | 5 | 75 | 192 |
| Do | 2 | 5 | 40 | 106 |

EXAMPLE 4

Example 3 was repeated using additional conventional catalysts and using a different foam formulation. The foam components were combined as in Example 3 and mixed for 15 sec. The foam formulation used was:

| | Weight (g.) |
|---|---|
| Isocyanate A | 100 |
| Trimellitic anhydride | 55 |
| Polyol B | 11 |
| Polyol E | 73 |
| Silicone surfactant | 2 |
| Liquid halogenated organo-phosphorus flame retardant | 10 |
| Water | 0.5 |
| R-11 | 30 |
| Catalyst | As below |

Components A and B were described above.

Polyol E is a carboxy-containing half-ester adduct polyol prepared by reacting Polyol D, tetrabromophthalic anhydride, and a polyethylene glycol in the weight ratio of 3/5/7.

TABLE IV

| Catalyst | Weight (g.) | Rise time | Tack free time | Percent ΔV* 200° F./ 1 hr. | Taber abrasion (cycles/ in.) |
|---|---|---|---|---|---|
| None | 0 | 175 | 390 | | |
| Antimony tallate | 0.5 | 85 | 212 | 7 | 428 |
| Do | 1.0 | 55 | 137 | 8 | 483 |
| Do | 1.5 | 42 | 125 | 2 | 513 |
| Do | 2.0 | 34 | 115 | 0 | 445 |
| Do | 2.5 | 30 | 93 | 2 | 411 |
| Do | 3.0 | 23 | 87 | 3 | 330 |
| Dibutyltin diacetate | 2 | 120 | 406 | 18 | 290 |
| Do | 3 | 95 | 330 | 17 | 391 |
| Do | 4 | 79 | 320 | 15 | 372 |
| Tetramethylethane diamine | 2 | 132 | 380 | 17 | 124 |
| Do | 3 | 115 | 335 | 13 | 74 |
| Do | 4 | 92 | 325 | 16 | 32 |
| Tetramethylbutane diamine | 2 | 125 | 350 | 15 | 89 |
| Do | 3 | 113 | 375 | 14 | 110 |
| Do | 4 | 94 | | 17 | 117 |

*Percent ΔV is the percentage of volume change.

What is claimed is:

1. In a process for producing a flame-resistant foam composition by the reaction of (1) a polyarylpolyisocyanate having at least two interconnected aromatic rings substituted with at least one isocyanato group per aromatic ring, (2) a polyfunctional aromatic carboxylic acid derivative comprising an aromatic nucleus substituted by carbonyl-based members selected from the group consisting of anhydride, carboxyl, and acyl halide, and (3) a carboxy-containing adduct polyol or mixture of adduct polyols prepared by reacting (a) at least one polyether polyol with (b) an anhydride of a polyfunctional carboxylic acid at a temperature between 150° F. and 350° F., the improvement comprising the carrying out of the foaming reaction in the presence of a catalytic amount of antimony tallate.

2. The process of claim 1 wherein a poly(ethylene glycol) is added to the carboxy-containing polyol.

References Cited

UNITED STATES PATENTS

| | | | |
|---|---|---|---|
| 3,609,106 | 9/1971 | Papa | 260—2.5 AB |
| 3,637,543 | 1/1972 | Kus | 260—2.5 AM |
| 3,245,958 | 4/1966 | Hindersinn | 260—2.5 AB |
| 3,642,646 | 2/1972 | Marcus | 252—182 |

FOREIGN PATENTS

| | | |
|---|---|---|
| 1,246,732 | 9/1971 | Great Britain. |
| 674,253 | 4/1966 | Belgium. |

DONALD E. CZAJA, Primary Examiner

C. W. IVY, Assistant Examiner

U.S. Cl. X.R.

260—2.5 AM, 2.5 AN, 2.5 AV, 75 NB, 77.5 AB